(12) United States Patent
Weng et al.

(10) Patent No.: US 7,012,926 B2
(45) Date of Patent: Mar. 14, 2006

(54) PACKET RECEIVING METHOD ON A NETWORK WITH PARALLEL AND MULTIPLEXING CAPABILITY

(75) Inventors: Chih-Hsien Weng, Miaoli Hsien (TW); Kuo-Ching Chen, Chung-Huo (TW); Tai-Cheng Chen, Taipei (TW)

(73) Assignee: VIA Technologies, Inc., Taiepi Hsien (TW)

( * ) Notice: Subject to any disclaimer, the term of this patent is extended or adjusted under 35 U.S.C. 154(b) by 714 days.

(21) Appl. No.: 09/746,010

(22) Filed: Dec. 21, 2000

(65) Prior Publication Data

US 2001/0007565 A1    Jul. 12, 2001

(30) Foreign Application Priority Data

Jan. 5, 2000    (TW) .............................. 89100085 A

(51) Int. Cl.
H04L 12/56    (2006.01)
(52) U.S. Cl. ...................... 370/412; 370/429; 370/474; 711/133
(58) Field of Classification Search ............ 370/395.1, 370/395.7, 395.71, 412, 415, 417, 428, 429, 370/474; 711/133, 142, 143, 154, 159
See application file for complete search history.

(56) References Cited

U.S. PATENT DOCUMENTS

| | | | |
|---|---|---|---|
| 4,654,654 A * | 3/1987 | Butler et al. ............. | 340/825.5 |
| 5,136,582 A * | 8/1992 | Firoozmand ................ | 370/400 |
| 5,303,302 A * | 4/1994 | Burrows ..................... | 713/161 |
| 5,400,326 A * | 3/1995 | Smith .......................... | 370/401 |
| 5,477,541 A * | 12/1995 | White et al. ................ | 370/392 |
| 5,633,865 A * | 5/1997 | Short .......................... | 370/412 |

\* cited by examiner

Primary Examiner—Chau Nguyen
Assistant Examiner—Joshua Kading
(74) Attorney, Agent, or Firm—J.C. Patents

(57) ABSTRACT

A packet receiving-transmitting method is provided for use on a packet-switching network, such as Ethernet, for the purpose of handling packets more efficiently than the prior art. By this method, each received packet is stored in a packet buffer of a fixed size and associated with just one descriptor. Based on a threshold logical segmentation size determined by the network protocol, each packet buffer is partitioned into a plurality of segments, each having an ending point linked to an Early Receive/Transmit interrupt signal with the ending point of the packet buffer being linked to an OK interrupt signal. In response to each Early Receive/Transmit interrupt signal, the packet data stored are retrieved and forwarded; and in response to the OK interrupt signal, all the remaining packet data in the packet buffer are retrieved and forwarded. After this a write-back operation is performed on the associated descriptor so as to reset the descriptor to unused status. This method can help allow the memory allocation to each received packet to be more efficient. Moreover, it can help reduce the total number of required interrupts during the receiving-transmitting operation for each received packet, and also can help reduce the total number of descriptor write-back operations for each received packet. This method is therefore significantly more advantageous in terms of system performance than the prior art.

17 Claims, 4 Drawing Sheets

PACKET RECEIVING METHOD ON A NETWORK WITH PARALLEL AND MULTIPLEXING CAPABILITY

CROSS-REFERENCE TO RELATED APPLICATION

This application claims the priority benefit of Taiwan application serial no. 89100085, filed Jan. 5, 2000.

BACKGROUND OF THE INVENTION

1. Field of the Invention

This invention relates to a method for receiving packets on a network, and more particularly, to a manage method of data buffers for network packets.

2. Description of Related Art

On a computer network, data are typically transmitted in type of packet. On the Ethernet, each packet is variably sized from 64 bytes to 1,520 bytes (B) in length and includes data and information, such as identification number and the source and destination addresses of the packet. When transmitted over the network, a packet will be routed through various nodes to its destination.

In packet transmission, the received packet is first stored in a packet buffer before forwarded to its destination. A conventional packet receiving-transmitting method for handling each received packet involves the use of two descriptor lists, one for packet reception and the other for packet forwarding. The descriptor lists are software data stored in the physical memory space during system initialization. Each descriptor is mapped to the address of the packet buffer where the received packet is temporarily stored before being forwarded to its destination.

FIG. 1 is a schematic diagram used to depict the mapping between a descriptor list and a packet buffer in a conventional packet receiving-transmitting method. As shown, the conventional packet receiving-transmitting method utilizes a storage unit 120 containing a plurality of packet buffers 120a, 120b, 120c, . . . etc., for temporary storage of each received packet. When a network driving software receives a packet 100, the computer system allocates one or several descriptors, such as 110a, 110b, 110c, . . . etc., for forming a descriptor list 110 used for receiving the packet 100. Each of the descriptors 110a, 110b, 110c, . . . , 110f, . . . , etc., is respectively linked to one of data buffers 120a, 120b, 120c, . . . , 120f, . . . etc. The sizes of the data buffers 120a, 120b, 120c, . . . are determined by software. For example, a packet 101 is stored in the data buffer 120d pointed by the descriptor 110d, and a packet 102 is stored in the data buffers 120e and 120f respectively pointed by the descriptors 110e and 110f. Each of the descriptors 110a, 110b, 110c, . . . etc. of the descriptor list 110 records an address of the next descriptor such that all the descriptors are linked together in sequence. Each descriptor is used for recording information such as the length and status of the received packet, and initial address and length of the data buffer and an address of the next descriptor.

FIG. 2 is a schematic diagram showing the data structure of each of the descriptors 110a, 110b, 110c in the descriptor list 110 shown in FIG. 1 (here exemplified by the first descriptor 110a). As shown, the descriptor 110a includes four data blocks RDES0, RDES1, RDES2, and RDES3, which record data length and status of the received packet, an initial address of the packet buffer where the associated packet is stored, and the address (pointer) of the next descriptor in the descriptor list 110.

Referring back to FIG. 1, in response to the received packet 100, the received packet 100 is stored in one of the packet buffers, for example the second packet buffer 120b. Conventionally, the storage space of the packet buffer 120b is sized dynamically in accordance with the length of the received packet 100 so that the packet buffer 120b is enough to accommodate the received packet 100. Moreover, the packet buffer 120b is associated with a plurality of descriptors 110a, 110b, 110c of the descriptor list 110. Each of the descriptors 110a, 110b, 110c is applied to register information about the received packet 100 as depicted in FIG. 2, and to store an Early-Receive (ER) interrupt signal, the length of the associated packet 100, and the starting address of the packet buffer where the associated packet 100 is temporarily stored. These information items allow the computer unit to retrieve the corresponding packet 100 from the associated packet buffer in the storage unit 120. After the packet data associated with the first descriptor 110a have been retrieved, the computer unit performs a write-back operation on the first descriptor 110a so as to reset to unused status. After this, the computer unit can gain access to the next descriptor 110b through the pointer of the first descriptor 110a, so that the computer unit can subsequently retrieve the packet data associated with the next descriptor 110b, and so forth for the third descriptor 110c. After the packet data associated with the second descriptor 110b have been retrieved, the computer unit performs a write-back operation on the second descriptor 110b so as to reset to unused status; and similarly, after the packet data associated with the third descriptor 110c have been retrieved, the computer unit performs a write-back operation on the third descriptor 110c so as to reset to unused status. When an OK interrupt signal appears in a certain descriptor, it indicates that this descriptor is the last one; and consequently, the computer unit will retrieve all the remaining packet data from the packet buffer 120b. This completes the forwarding operation for the received packet 100.

The foregoing packet receiving-transmitting method, however, has some draw-backs. First, it involves a lot of interrupt operations for each descriptor in the descriptor list, which would result in an inefficient receiving-transmitting operation. Moreover, since each received packet is variable in size, it would be difficult to allocate a corresponding space for the packet buffer in the storage unit. Still moreover, since each received packet is associated with a plurality of descriptors and each descriptor requires a write-back operation after the associated packet data is retrieved, it would involve a number of write-back operations for all the descriptors in the received packet during the receiving-transmitting operation for each received packet, which would considerably slow down the system performance. For evaluating performance and efficiency for receiving packets, following aspects should be noticed.

Firstly, transmission time required from a link layer controller and a network driving software to data blocks of an application software should be considered.

Secondly, time and efficiency of occupying the system bus for the link layer controller reading the descriptor list, performing a status write back procedure and transmitting data to the data buffers through DMA should be also considered.

In addition, it cannot be interrupted too much during packet receiving procedure.

SUMMARY OF THE INVENTION

It is therefore an objective of this invention to provide an improved packet receiving-transmitting method, which allows the allocation of a packet buffer to each received packet to be carried out without having to dynamically size the buffer space for each received packet of a variable length so that the memory allocation operation would be efficient.

It is another objective of this invention to provide an improved packet receiving-transmitting method, which can help reduce the number of required interrupts during the receiving-transmitting operation for each received packet so as to increase system performance.

It is still another objective of this invention to provide an improved packet receiving-transmitting method, which can help reduce the number of required descriptor write-back operations for each received packet so as to increase system performance.

In accordance with the foregoing and other objectives of this invention, an improved packet receiving-transmitting method is provided. The packet receiving-transmitting method of the invention includes the following steps: allocating a descriptor and a data buffer, the descriptor for recording a link status between the descriptor and the data buffer and a reception status of a packet, and the data buffer for storing the packet, and the size of the data buffer being fixed; activating an early interrupt mode and setting a logical segmentation size value; dividing the data buffer according to the logical segmentation size value, and setting an early receiving interrupt signal and a ready interrupt signal according to the logical segmentation size value; in response to the early receiving interrupt signal, starting to read the packet stored in the data buffer; and in response to the ready interrupt signal, retrieving and forwarding the remained packet data.

In the foregoing mentioned method, further comprising the step of: asserting the early receiving interrupt signal, when a specified length of the packet defined by the logical segmentation size value has been moved to the data buffer; asserting the ready interrupt signal, when the whole packet has completely been moved to the data buffer; and performing a write-back operation on the descriptor after all the packet data stored in the data buffer have been forwarded so as to reset the descriptor. When the packet is an Ethernet packet, the size of data buffer is fixed at 1520 bytes.

The present invention also provides a packet receiving apparatus, which include a descriptor, a data buffer, and a controller. The descriptor is applied for handling a packet. The data buffer is linked to the descriptor for storing the packet, wherein the data buffer has a fixed size. The controller is applied for receiving the packet. When the controller has moved a specified length of the packet defined by a logical segmentation size value to the data buffer, the controller asserts an early receiving interrupt signal. In response to the early receiving interrupt signal, a network driving software starts to read the packet stored in the data buffer. When the controller has completely moved the whole packet to the data buffer, the controller asserts a ready interrupt signal. In response to the ready interrupt signal, the network driving software retrieves and forwards the remained packet data.

Therefore, according to the present invention, only one descriptor is linked to a data buffer for storing the received packet. For each packet, only one write back procedure needs to be performed on the descriptor. In addition, the size of the allocated data buffer is fixed at the maximum packet length no matter the actual length of the received packet. Accordingly, the conventional improper allocation of the data buffers, wasting resource of the system bus due to multiple read operations of the descriptors and many write back procedures, can be avoided. By a protocol between the network driving software and the link layer controller, the data buffer can be divided into segments according to a logical segmentation size value. Each segment of the data buffer defined by the logical segmentation size value can be early received according to an early receiving interrupt signal. When the whole packet is completed stored in the data buffer, an interrupt OK signal is linked to the end of the packet, the network driving software can thus moves the remained data indicated by the interrupt OK signal. Therefore, the interrupt can be controlled by the logical segmentation size value and the actual size of the packet.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The invention provides a packet receiving-transmitting method in a packet-switching network for efficient handling of the packets that are received and to be subsequently forwarded to their destinations. The method of the invention is characterized particularly in that only one descriptor, rather than a plurality of descriptors linked into a list in the case of the prior art, is associated with each received packet. A preferred embodiment of the invention is disclosed in full details in the following with reference to FIGS. 3 through 5.

Figure 3:
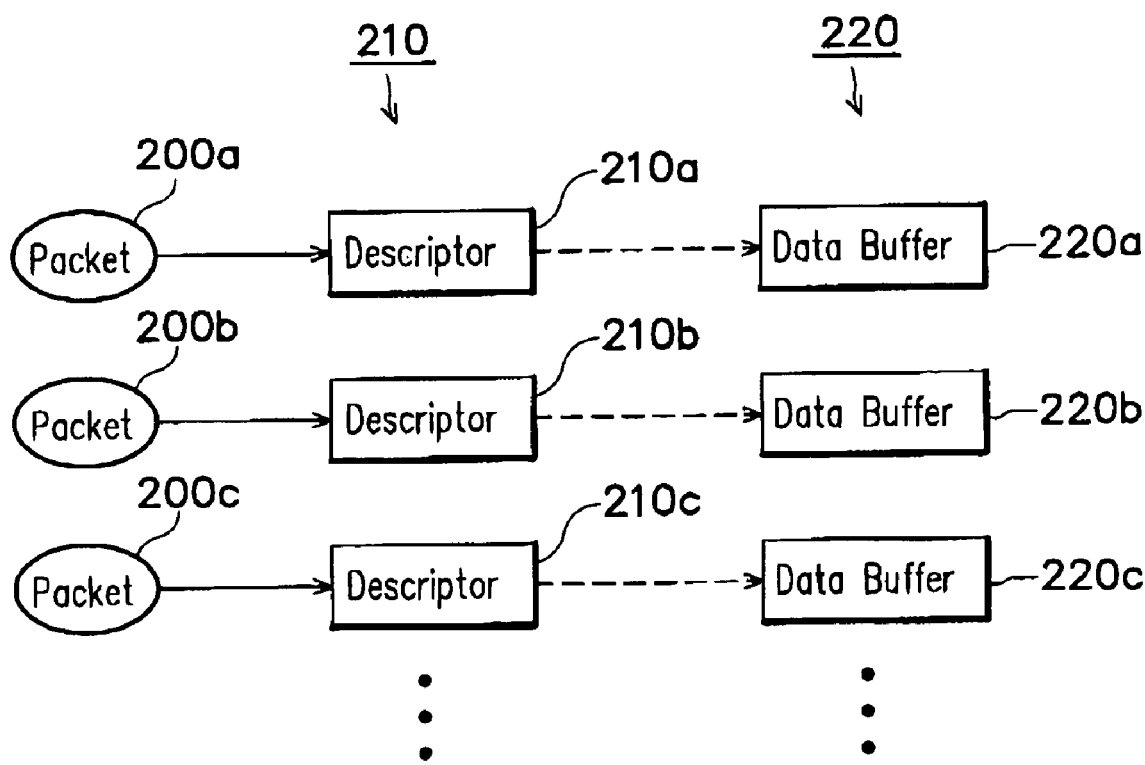
FIG. 3 is a schematic diagram depicting the mapping between a descriptor and a packet buffer utilized by the packet receiving-transmitting of the invention.

FIG. 3 is a schematic diagram depicting the mapping between a descriptor and a packet buffer utilized by the method of the packet receiving-transmitting with parallel multiplexing capability of the invention.

A computer located at a node of a network is used as an example. During initiating a network driving software, the computer allocates a descriptor list 210 and activates an early receiving mode, and then a logical segmentation size value for receiving a packet is determined. After the initiating process is finished and when a packet 200a is sent to the computer, a link layer controller, such as a network MAC controller, moves the packet 200a to a data buffer 220a pointed by a descriptor 210a through DMA (direct memory access) manner. The data buffer 220a is used for temporally storing the packet 200a, and the descriptor 210a is used for recording receiving length and status of the packet 200a and related information of the data buffer 220a. According to a particular protocol for transmission and interrupt, when the link layer controller has moved a specified length of the packet above the logical segmentation size value to the data buffer 220*a*, an early receiving interrupt signal (ER signal) is asserted. In response to the ER signal, the network driving software starts to read the packet data that has already been stored in the data buffer. When the link layer controller has completely moved the whole packet 200*a* to the data buffer 220*a*, an interrupt OK signal is asserted. In the same time, the link layer controller performs a write back process for reset the descriptor 210*a*. In response to the interrupt OK signal, the network driving software reads the remained packet data in the data buffer 220*a* according to the packet length and receiving status of the packet recorded by the descriptor 210*a*.

Similarly, the receiving process and operations of the descriptor 210*b* and data buffer 220*b* are same as the foregoing description.

Figure 1:
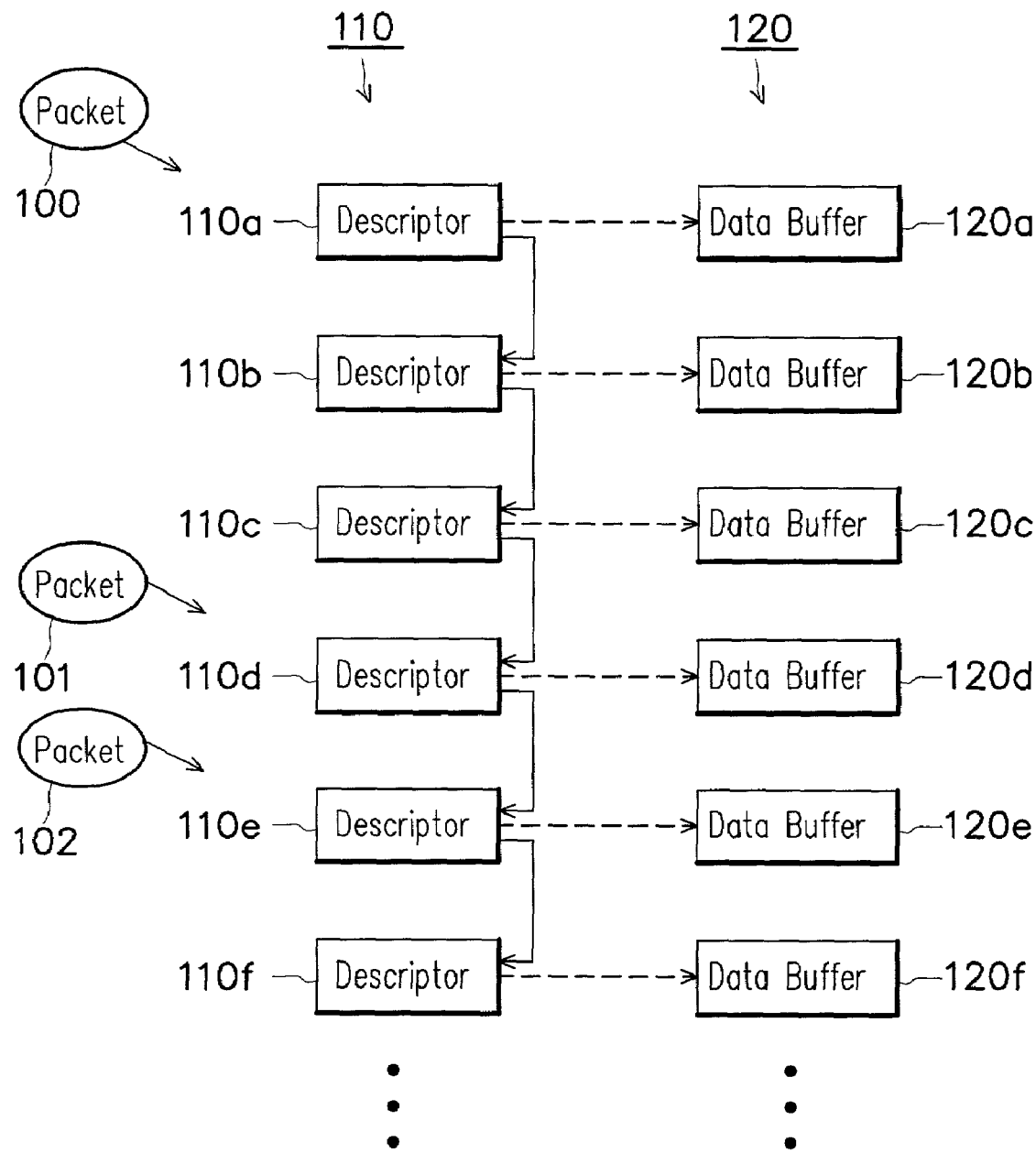
FIG. 1 is a schematic diagram depicting the mapping between a descriptor list and a packet buffer utilized by a conventional packet receiving-transmitting.
Figure 2:
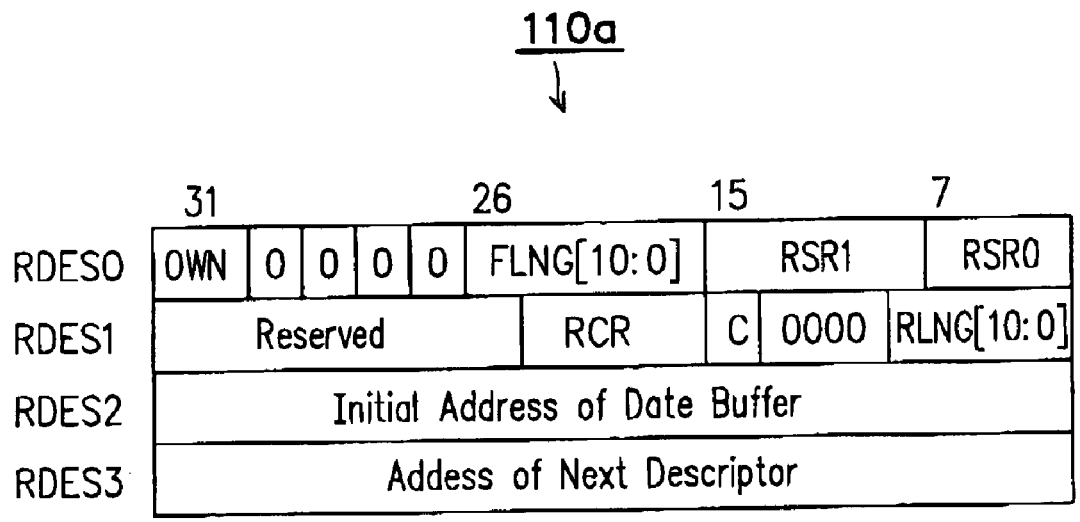
FIG. 2 is a schematic diagram showing the data structure of each of the descriptors shown in FIG. 1.

Basically, the descriptor includes three data blocks RDES0, RDES1, RDES2, and RDES3, which are substantially identical in format and function as those shown in FIG. 2.

The block RDES0 is 32 bits in length, wherein bits 0–15 are used for registering reception status data; bits 16–26 are used for registering the length of the associated packet; bits 27–30 are used for indicating whether the associated packet is sized in a normal length or not; and bit 31 is used as an owner bit OWN indicative of whether this descriptor is used by the network card controller (OWN=1) or unused (OWN=0). At beginning, the OWN bit is set to 1 by the network driving software, which means that the whole descriptor list 210 and data buffers pointed by the descriptor list 210 are all available to the link layer controller. When the link layer controller completely processes for the packet and a write back process is done, the OWN bit is then reset to 0.

For OWN=1, it indicates that the data buffer pointed a descriptor (such as the descriptor 210*a*) is an available memory space for the link layer controller (such as an Ethernet MAC controller). After a write back process is performed by the MAC controller, the OWN bit is reset to 0, which means the network driving software has to process the data buffer with the packet stored therein. When the network driving software finishes the received packet, the OWN bit is reset to 1 for releasing the data buffer. The transfer of the authority of the descriptor between the link layer controller (the MAC controller) and the network driving software is indicated by the OWN bit.

Block RDES1 is used for recording length and control information of the data buffer (such as 220*a*). Block RDES2 is used for recording an initial address of a descriptor (such as 210*a*) and block RDES3 is used for recording an initial address of a next descriptor (such as 210*b*) adjacent to the current descriptor (such as 210*a*).

Referring back to FIG. 3, in accordance with the invention, the packet buffers 220*a*, 220*b*, 220*c* in the storage unit 220 are each sized fixedly to the maximum allowable packet length specified by the network protocol. In the case of Ethernet, for example, the maximum allowable packet length is 1,520 bytes (B), and therefore, each packet buffer has a size of 1,520 bytes. Moreover, each packet buffer is partitioned by an early-interruption logical segmentation size value into a plurality of segments, with each dividing point linking to an Early Receive/Transmit interrupt signal, so that the packet data can be forwarded in segments. After a link layer controller moves a specified data length defined by the logical segmentation size value to the data buffer 220*a* through direct memory access (DMA), an early interrupt signal is asserted. While the whole packet is completely moved to the data buffer 220*a*, the link layer controller performs a write back procedure and asserts an OK interrupt signal. Then, a network driving software can completely process the packet according to the OK interrupt signal and receiving status. Afterwards, the OWN bit of the descriptor 210*a* is reset to 1.

Figure 4:
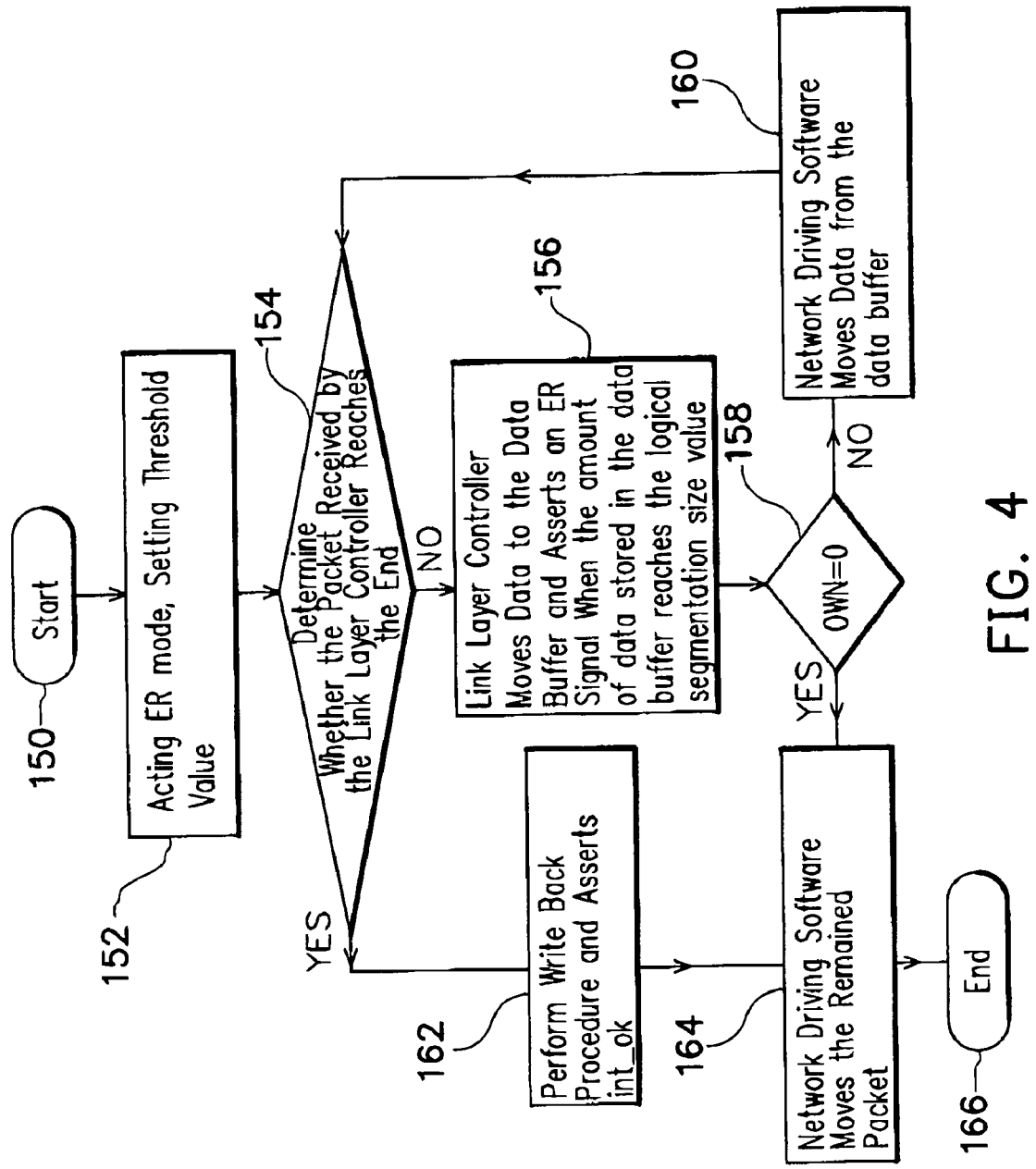
FIG. 4 is a flow diagram showing the procedural steps carried out by the packet receiving-transmitting method of the invention in response to each received packet.

FIG. 4 is a flow diagram showing the procedural steps carried out by the packet receiving-transmitting method of the invention in response to each received packet. In this preferred embodiment, the method of the invention is utilized on Ethernet. However, the invention is not limited to the utilization on Ethernet, and instead can be utilized on any types of packet-switching networks.

Referring to FIG. 4 together with FIG. 3, in the initial step 150, the procedure is started in response to a received packet 200*a*. When the computer receives the packet 200*a*, the network driving software allocates a descriptor list 210 and data buffers 220 pointed by the descriptor list 210 from a memory, in which both form a packet buffer region for receiving the packets. For example, when a packet 200*a* is received, the network driving software allocates a descriptor 210*a* from the descriptor list 210 and a data buffer 220*a* to the packet 200*a*. The data buffer 220*a* is used for storing the packet 200*a* and the descriptor 210*a* is used for recording related information of the packet 200*a* and the data buffer 220*a*, such as an initial address and status of the data buffer, an interrupt information and packet length etc. In addition, it is an important aspect of the invention that the allocated buffer space for the packet 200*a* is always in a fixed length irrespective of the actual size of the received packet 200*a*. In the case of Ethernet, each packet buffer is set to a fixed size of 1,520 bytes for temporary storage of each received packet.

Figure 5:
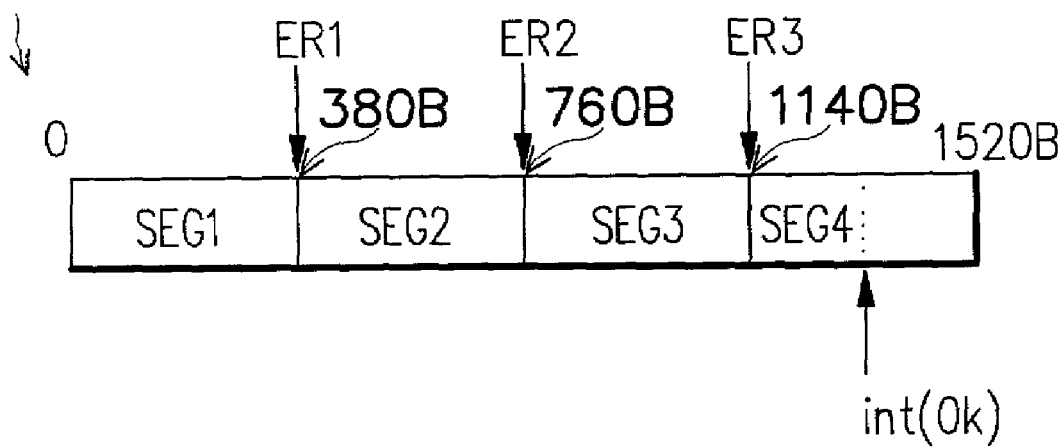
FIG. 5 is a schematic diagram showing the data structure of each packet buffer utilized by the invention.

In the next step 152, the computer unit is switched to an Early Receive (ER) mode, and meanwhile a logical segmentation size value is set in accordance with the network hardware/software. The logical segmentation size value is used in partitioning each data buffer into a plurality of segments, with each dividing point (i.e., the end of each segment other than the last segment) being linked to an Early Receive/Transmit interrupt signal and the end of the packet being linked to an interrupt OK signal. FIG. 5 shows an example of using a logical segmentation size value of 380 B to partition each packet buffer. As shown, each 1,520 B packet buffer (as exemplified by the first packet buffer 220*a*) is partitioned by the logical segmentation size value into four segments SEG1, SEG2, SEG3, and SEG4, with the dividing points being located respectively at 380 B, 760 B, and 1,140 B and corresponding respectively to three Early Receive/Transmit interrupt signals ER1, ER2, and ER3. Further, the end point of the packet 220*a* is linked to an interrupt OK signal Int(OK). In this partition scheme, the logical segmentation size value is determined by the network hardware/software protocol, which can be automatically furnished by the software. Other rather than 4 segments are possible.

In the step 154, the link layer controller determines whether the received packet reaches the end of the whole packet. If not, step 156 is performed. In step 156, the link layer controller reads a specified length of the packet 200*a* defined by the logical segmentation size value, moves the specified length data to the data buffer 220*a* through DMA and then asserts an early interrupt signal ER1. When the network driving software detects the ER1 signal and the OWN bit is not 0 (step 158), step 160 is then executed such that the network driving software moves the specified length of the packet defined by the logical segmentation size value from the data buffer 220*a* pointed by the descriptor 210*a*.

Similarly, data corresponding to early interrupt signals ER2 and ER3 are processed in sequence. After the remained data of the packet is moved to the data buffer 220a (step 164), step 162 is executed for performing a write back procedure and asserting an interrupt OK signal such that the network software can move the remained data of the packet 200a. Furthermore, if the computer is busy on other application services, it might cause the interrupt Ok signal int(OK) is driven but the network driving software still doesn't finish process corresponding to the early interrupt signal ER. For such circumstance, the execution of the step 158 can solve this problem. According to the 31-th bit, the OWN bit, of block RDSE0 of the descriptor 210a, the network driving software determines the status of the descriptor 210a. When the OWN bit=0, it represents the link layer controller has stored the whole received packet into the data buffer 220a, and then the step 164 is executed. The remained data of the packet 200a is moved out of the data buffer 220a according to the length and reception status of the received packet recorded in the descriptor 210a. Thus, the write back procedure is performed to reset the recorded status of RDES0 of the descriptor 210a. Finally, the OWN bit is reset to 1 for releasing the authority of the descriptor 210a to the link layer controller, by which the descriptor can be repeatedly used.

From the foregoing description, it is known that, for each received packet, the computer unit allocates a data buffer of the same fixed size for temporary storage of the received packet before it is forwarded. This scheme allows the memory allocation operation for each received packet to be more efficient than the prior art by which the packet buffer space is dynamically allocated based on the actual size of the received packet. Moreover, each packet buffer is partitioned based on a logical segmentation size value determined by the network hardware/software protocol. The memory allocation for temporary storage of each received packet is therefore more flexible than the prior art.

Moreover, the invention is further advantageous than the prior art in that the receiving-transmitting operation for each received packet in accordance with the invention involves a fewer number of interrupts than the prior art. More specifically, the method of the invention involves a number of Early Receive interrupts, which is equal to the selected logical segmentation size value, plus one OK interrupt. In the case of FIG. 5, for example, the total number of interrupts is 4, including three Early Receive interrupts and one OK interrupt. Generally speaking, the total number of interrupts is equal to the logical segmentation size value plus one. By the invention, only one descriptor is required for association with each received packet. Therefore, when the forwarding of a packet is completed, it requires only one write-back procedure of many as in the case of the prior art to reset the associated descriptor to unused status. The invention is therefore more advantageous than the prior art.

Furthermore, according to the invention, each received packet is associated with one fixed-size packet buffer and one descriptor rather than one variable-size packet buffer and a plurality of descriptors as in the case of the prior art. As shown in FIG. 3, when three packets 200a, 200b, 200c are received, they are respectively associated with three data buffers 210a, 210b, 210c of the same fixed size and three individual descriptors 220a, 220b, 220c. These packets can be received and forwarded both in a parallel and multiplexing manner defined by the network hardware/software protocol.

In conclusion, the invention is characterized in the association of each received packet with only one packet buffer and one descriptor. This feature allows the elimination of the linking between the plurality of descriptors associated with each received packet as in the case of the prior art, thereby simplifying the packet receiving-transmitting operation and enhancing the system performance. For each received packet, it needs only one read operation for the descriptor and therefore only one write back procedure to the descriptor is required.

No matter the actual size of the received packet, data buffers with the same fixed size are respectively allocated to the received packets. Therefore, it can avoid improper allocation of the data buffers, causing requiring more than one descriptors to link to the data buffers for a lengthy packet. Thus, read operations of the descriptor and write back procedure for one packet can be reduced.

Still moreover, the invention is further characterized in the use of a logical segmentation size whose value is determined by the network hardware, such as a link layer controller (MAC controller) or software protocol to partition each packet buffer into a plurality of segments, with each dividing point corresponding to an Early Receive interrupt signal and the ending point of the packet corresponding to an OK interrupt signal. This feature allows the total number of interrupts involved in the receiving-transmitting operation for each received packet to be significantly reduced as compared to the prior art. The invention is therefore more advantageous than the prior art.

The invention has been described using exemplary preferred embodiments. However, it is to be understood that the scope of the invention is not limited to the disclosed embodiments, On the contrary, it is intended to cover various modifications and similar arrangements. The scope of the claims, therefore, should be accorded the broadest interpretation so as to encompass all such modifications and similar arrangements.

What is claimed is:

1. A packet receiving method for use on a packet-switching network for handling received packet, comprising the steps of:
   allocating a descriptor and a data buffer, the descriptor for recording a link status between the descriptor and the data buffer and a reception status of a packet, and the data buffer for storing the packet, and a size of the data buffer being fixed;
   activating an early interrupt mode and setting a logical segmentation size value;
   dividing the data buffer by the logical segmentation size value into a plurality of segments, and setting an early receiving interrupt signal and a ready interrupt signal according to the logical segmentation size value;
   in response to the early receiving interrupt signal, reading a part of the packet stored in the data buffer, and not performing a write-back operation after reading the part of the packet stored in the data buffer; and
   in response to the ready interrupt signal, retrieving and forwarding a remaining part of the packet stored in the data buffer.

2. The method of claim 1, further comprising the step of: performing the write-back operation on the descriptor after the whole packet stored in the data buffer has been forwarded so as to reset the descriptor.

3. The method of claim 1, further comprising the step of: asserting the ready interrupt signal when the whole packet has completely been moved to the data buffer.

4. The method of claim 1, further comprising the step of: moving a data amount of the packet into the data buffer; and asserting the early receiving interrupt signal when the data amount of the packet moved into the data buffer exceeds one of the segments.

5. The method of claim 1, wherein the packet-switching network is Ethernet.

6. A packet receiving apparatus, comprising:
a descriptor for handling a packet;
a data buffer linked to the descriptor for storing the packet, wherein the data buffer has a fixed size and is partitioned into a plurality of segments, with each dividing point being linked to an early receiving interrupt signal and the end of the packet being linked to a ready interrupt signal; and
a controller for receiving the packet, when the controller has moved a specified length of the packet above a logical segmentation size value to the data buffer, asserting the early receiving interrupt signal; when the controller has completely moved the whole packet to the data buffer, asserting the ready interrupt signal; in response to the early receiving interrupt signal, starting to read the packet stored in the data buffer; and in response to the ready interrupt signal, retrieving and forwarding a remaining part of the packet stored in the data buffer.

7. The packet receiving apparatus of claim 6, wherein the controller performs a write-back operation on the descriptor after the whole packet stored in the data buffer has been forwarded so as to reset the descriptor.

8. A packet receiving method for use on a packet-switching network for handling a plurality of received packets, comprising the steps of:
allocating one descriptor and a corresponding data buffer, the descriptor for recording a link status between the descriptor and the data buffer and a reception status of a packet, and the data buffer for storing the packet;
setting a logical segmentation size value and dividing the data buffer into several segments according to the logical segmentation size;
determining whether the packet has completely been received;
if No:
asserting an early receiving interrupt signal, when a length of the packet above the logical segmentation size value has been moved to the data buffer;
checking the reception status of the packet in response to the early receiving interrupt signal;
retrieving a part of the packet stored in the data buffer when the reception status of the packet indicates that the packet has not completely been moved to the data buffer; and
retrieving a remaining part of the packet stored in the data buffer when the reception status of the packet indicates that the whole packet has completely been moved to the data buffer; and
if YES:
asserting a ready interrupt signal and performing a write-back operation on the descriptor so as to reset the reception status of the packet when the whole packet has completely been moved to the data buffer; and
retrieving the remaining part of the packet in response to the ready interrupt signal.

9. The method of claim 8, wherein the packet-switching network is Ethernet.

10. A method for processing packets, comprising the steps of:
initializing a plurality of data buffers for storing the packets and a plurality of descriptors, each of said descriptors being indicative of one of said data buffers, wherein each said descriptor has a packet reception status and a link status recording information between the descriptor and a corresponding data buffer indicated by the descriptor, wherein each said data buffer has a fixed size;
setting a logical segmentation size value;
dividing each of said data buffers by said logical segmentation size value into a plurality of segments;
receiving a packet and storing said packet in one of said data buffers;
outputting a segment of said one of said data buffers when the segment is fully filled by a partial packet; and
performing a write-back operation when the packet is totally outputted.

11. The method of claim 10, further comprises:
asserting an early receiving interrupt signal when the partial packet exceeds a capacity of the segment.

12. The method of claim 10, wherein packets are received through a network card and said data buffers are located in a system memory of a host computer wherein said network card is located.

13. The method of claim 10, wherein the fixed size of the data buffer is the same as a maximum size of a standard packet.

14. The method of claim 10, further comprises:
adjusting said logical segmentation size value.

15. An apparatus for processing a plurality of packets, comprising:
a plurality of descriptors, wherein each of said descriptors handles one of the packets at a time;
a plurality of data buffers for storing the packets, wherein each of said data buffers has a fixed size and is linked to one of said descriptors; and
a controller for controlling said descriptors and said data buffers, wherein said controller divides each of said data buffers into a plurality of segments according to a logical segmentation size value, wherein said controller controls each of said descriptors to receive at least a part of a corresponding packet and to store said received part in one corresponding data buffer, said controller also controls each of said descriptors to output a segment of one corresponding data buffer when the segment is fully filled by a partial packet and performs a write-back operation when the corresponding packet is totally outputted,
wherein said descriptors and said data buffers are connected to a network card for receiving said packets, and said data buffers at least are in a system memory of a host computer where said network card is located.

16. The apparatus of claim 15, wherein an early receiving interrupt signal is asserted by said controller when the partial packet exceeds a capacity of the segment.

17. The apparatus of claim 15, wherein the fixed size of the data buffer is the same as a maximum size of a standard packet and said logical segmentation size value is adjustable.

* * * * *